United States Patent [19]
Peck, Jr. et al.

[11] Patent Number: 5,892,868
[45] Date of Patent: Apr. 6, 1999

[54] FIBER OPTIC COUPLER COMBINER AND PROCESS USING SAME

[75] Inventors: James L. Peck, Jr., Huntington Beach; Jeffrey S. Schoenwald, Thousand Oaks; Stephen W. Clausi, Huntington Beach, all of Calif.

[73] Assignee: Boeing North American, Inc., Seal Beach, Calif.

[21] Appl. No.: 839,993

[22] Filed: Apr. 24, 1997

[51] Int. Cl.$^6$ ........................................ G02B 6/32
[52] U.S. Cl. ........................ 385/34; 385/33; 385/24; 385/44; 385/46
[58] Field of Search ................... 385/33, 34, 42, 385/24, 44, 45, 46, 47

[56] References Cited

U.S. PATENT DOCUMENTS

| | | | |
|---|---|---|---|
| 3,937,557 | 2/1976 | Milton | 385/34 X |
| 4,600,267 | 7/1986 | Yamasaki et al. | 385/33 X |
| 4,626,069 | 12/1986 | Dammann et al. | 385/33 X |
| 5,559,911 | 9/1996 | Forkner et al. | 385/33 |
| 5,666,448 | 9/1997 | Schoewald et al. | 385/44 |
| 5,761,357 | 6/1998 | Peck, Jr. | 385/44 |

*Primary Examiner*—Brian Healy
*Attorney, Agent, or Firm*—Harry B. Field; Steven E. Kahm

[57] ABSTRACT

A fiber optic coupler having a first lens element for inputting a point source of light from an optical cable and outputting a collimated light, optically coupled to one or more lens elements for receiving an input of collimated light from the first lens element and outputting a focused point of light into a fiber optic cable. The lens elements can be gradient index lens. The lens elements can be of varying sizes such that the first lens element can optically connect to one or more smaller lens elements to couple or split optical signals for two way communication on the optical cables.

5 Claims, 1 Drawing Sheet

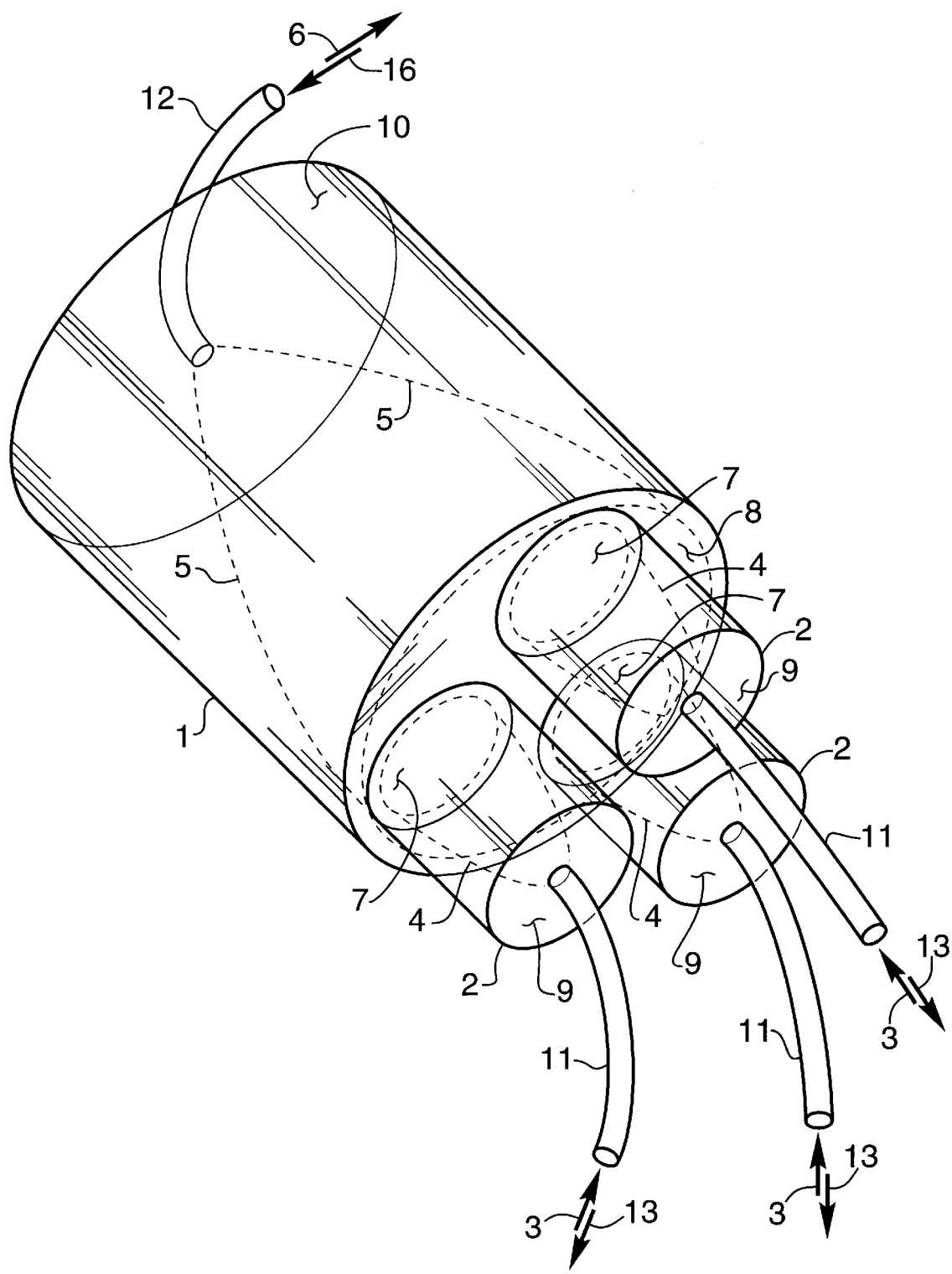

FIBER OPTIC COUPLER COMBINER AND PROCESS USING SAME

BACKGROUND OF THE INVENTION

1. Field of the Invention

This invention relates to fiber optic coupling and more particularly to multiple small lens elements coupled to a larger lens element for transferring collimated light at the interface for bilaterally combining or dividing light.

2. Description of the Related Art

In the past, transfers of light from one optical fiber to one or more others was accomplished by fusing two or more fibers together at an interface, or by reflecting a portion of a first beam in one direction and transmitting a second beam portion through a plate, or by reflecting a portion of a beam by a reflecting means partly in the beam path.

SUMMARY OF THE INVENTION

A large lens element for receiving light from a fiber optic cable and collimating the light at an interface surface. At least one smaller lens element interface surface adjacent the large lens element interface surface for receiving a portion of the collimated light and focusing it to a fiber optic cable. The device is bidirectional. Light from a plurality of optical fibers can be collimated by a plurality of small lens elements having interface surfaces adjacent a large lens element interface surface. The large lens element focusing the input light from the plurality of small lens elements into a fiber optic cable. A plurality of light sources can thus be combined.

OBJECTS OF THE INVENTION

It is an object of the invention to provide bidirectional light splitting and coupling for fiber optic communications.

It is a further object of the invention to provide low-loss connections for fiber optic communications in splitters and couplers.

Other objects, advantages and novel features of the present invention will become apparent from the following detailed description of the invention when considered in conjunction with the accompanying drawing.

BRIEF DESCRIPTION OF THE DRAWING

The FIGURE is a perspective view of the fiber optic coupler combiner of the present invention showing a fiber optic cable connected to a large lens element adjacent a plurality of smaller lens elements connected to fiber optic cables.

DETAILED DESCRIPTION IF THE PREFERRED EMBODIMENT

As shown in the figure, a large diameter quarter pitch gradient index (GRIN) lens 1 has an input of point source light 16 from fiber optic cable 12 at the focused end 10. Large GRIN lens 1 collimates the light at the collimated end 8. Dashed lines 5 show the propagation envelope of the light in the large GRIN lens 1.

Three small diameter quarter pitch GRIN lenses 2 are shown with their respective collimated ends 7 attached to the collimated end 8 of the large GRIN lens 1. The small GRIN lenses 2 focus the light from large GRIN lens 1 to a point at a respective focused end 9 whereupon lights 13 exit the small GRIN lenses 2 by way of respective fiber optic cables 11. The dashed lines 4 show the propagation envelope of the light in the small GRIN lenses 2. Although three small GRIN lenses 2 are depicted, there may be any number used.

Fiber optic cables 11 are attached at the focused end 9 of the small diameter GRIN lenses 2. Fiber optic cable 12 is attached at the focused end 10 of the large diameter GRIN lens 1.

The collimated ends 7 of small GRIN lenses 2 are attached to the collimated end 8 of large GRIN lens 1 by means which are well known in the art, such as being bonded with conventional optical adhesives.

When lights 3 in fiber optic cables 11 enter the focused ends 9 of small GRIN lenses 2, they are expanded in respective propagation envelopes 4, from a point source at focused ends 9 to collimated beams at collimated ends 7. Collimated light beams from the GRIN lenses 2 are transmitted into the collimated end 8 of large GRIN lens 1 and focused along propagation envelope 5 to a point at focused end 10 where it is transmitted into fiber optic cable 12 as light beam 6.

As can be readily seen, the reverse flow of light 16 in fiber optical cable 12 will be collimated in GRIN lens 1. The portions of light incident on GRIN lenses 2 will be focused and transmitted on fiber optic cables 11 as respective lights 13.

Therefore there can be two-way communication of signals on optical cables 11 and 12 when the light transmitted is in the form of light signals, with the interface of the small GRIN lenses 2 and the large GRIN lens 1 acting as couplers as shown in the figure. The light signals 3 from the fiber optic cables 11 are combined into one fiber optic cable 12 as light signals 6. The reverse flow has a light signal 16 on fiber optic cable 12 divided into light signals 13 on fiber optic cables 11.

It should be understood that the relative size of GRIN lenses 1 and 2 can be varied to split the light signal from fiber optical cable 12 into different intensities as a ratio of the interface surfaces at collimated ends 8 and 7 in contact.

It should also be understood that the number of ways the signal can be spilt and combined is a function of how many GRIN lenses 2 can be attached to GRIN lens 1 at their respective collimated ends 7 and 8.

In one embodiment GRIN lenses of identical size may be used as a connection from one optical cable to another without splitting or combining signals.

Alternatively, GRIN lenses may be replaced by any focusing elements which will perform the same function, such as glass lenses.

The transmission efficiency of light through the fiber optic coupler combiner is higher than in fused connections because all of the light present at the interface is collected for transmission, whereas fused connections diffuse a large amount of light.

Obviously , many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. A fiber optic combiner for combining a plurality of individual light signals into a combined light signal, the fiber optic combiner comprising:
   a. a plurality of two or more smaller GRIN lenses, each smaller GRIN lens comprising:
      i. a light receiver point for receiving a respective individual light signal, ii. a body for directing the respective individual light signal from the light receiver point and collimating the respective individual light signal into a respective collimated individual light signal, and
 iii. a first collimated beam face through which the respective collimated individual light signal exits the respective first lens element, wherein the body has a length between the light receiver point and the first collimated beam face of one quarter of a wavelength; and b. a larger GRIN lens comprising:
 i. a second collimated beam face for receiving the collimated individual light signals from the first collimated beam faces,
 ii. a body for directing the collimated individual light signals from the second collimated beam face and focusing the collimated individual light signals to the combined light signal, and
 iii. a focused light exit point for the combined light signal to exit the second lens element, wherein the body has a length between the light receiver point and the first collimated beam face of one quarter of a wavelength.

2. The fiber optic combiner of claim 1 wherein at least one of the first collimated beam faces is attached to the second collimated beam face.

3. The fiber optic combiner of claim 1 wherein a first fiber optic is functionally attached to the light receiver point and a second fiber optic is functionally attached to the focused light exit point.

4. The process of combining light from a plurality of light transmitting devices into a light receiving device comprising the steps of:
 a. collimating the light from the plurality of light transmitting devices into respective collimated light beams using respective smaller GRIN lenses having a length of one quarter of a wavelength; and
 b. combining, focusing, and directing the collimated light beams to the light receiving device using a larger GRIN lens having a length of one quarter of a wavelength.

5. The process of claim 4, wherein:
 a. the light transmitting devices and the light receiving device are fiber optics; and
 b. the collimating ends of the smaller GRIN lenses are attached to the collimating end of the larger GRIN lens.

* * * * *